US012521726B2

(12) United States Patent
Chung et al.

(10) Patent No.: US 12,521,726 B2
(45) Date of Patent: Jan. 13, 2026

(54) MICRONIZING APPARATUS FOR HYDROGEL OF SUPER ABSORBENT POLYMER

(71) Applicant: LG CHEM, LTD., Seoul (KR)

(72) Inventors: Ui Seok Chung, Daejeon (KR); Yoon Jae Min, Daejeon (KR); Gicheul Kim, Daejeon (KR); Tae Yun Kim, Daejeon (KR); Heechang Woo, Daejeon (KR); Sangwon Han, Daejeon (KR)

(73) Assignee: LG CHEM, LTD., Seoul (KR)

( * ) Notice: Subject to any disclaimer, the term of this patent is extended or adjusted under 35 U.S.C. 154(b) by 265 days.

(21) Appl. No.: 18/031,871

(22) PCT Filed: Jun. 20, 2022

(86) PCT No.: PCT/KR2022/008726
§ 371 (c)(1),
(2) Date: Apr. 13, 2023

(87) PCT Pub. No.: WO2022/265476
PCT Pub. Date: Dec. 22, 2022

(65) Prior Publication Data

US 2023/0381788 A1 Nov. 30, 2023

(30) Foreign Application Priority Data

| | | | |
|---|---|---|---|
| Jun. 18, 2021 | (KR) | ........................ | 10-2021-0079644 |
| Jun. 21, 2021 | (KR) | ........................ | 10-2021-0080344 |
| Jun. 20, 2022 | (KR) | ........................ | 10-2022-0074876 |

(51) Int. Cl.
*B02C 18/06* (2006.01)
*B01F 27/271* (2022.01)
(Continued)

(52) U.S. Cl.
CPC .......... *B02C 18/065* (2013.01); *B01F 27/271* (2022.01); *B01F 27/2712* (2022.01);
(Continued)

(58) Field of Classification Search
CPC .... B01F 23/56; B01F 27/812; B01F 25/4511; B01F 27/27; B01F 27/8111; B01F 33/862;
(Continued)

(56) References Cited

U.S. PATENT DOCUMENTS 311,626 A * 2/1885 Wilson .................. B01F 27/271 241/261.1
351,617 A * 10/1886 Anderson ................. B02C 7/06 241/261.1
(Continued)

FOREIGN PATENT DOCUMENTS

CH 604894 A5 9/1978
CN 2327443 Y 7/1999
(Continued)

OTHER PUBLICATIONS

Office Action dated Jan. 2, 2025 issued in related Chinese Patent Application No. 202280006910.3.
(Continued)

*Primary Examiner* — Charles Cooley
(74) *Attorney, Agent, or Firm* — Morgan, Lewis & Bockius LLP

(57) ABSTRACT

The micronizing apparatus includes: a body having a transfer space where hydrogel is transferred, and a discharge space where ground hydrogel is discharged; a rotation shaft disposed in the transfer space, wherein at least one screw is formed on an outer perimeter surface of the first rotation shaft, to transfer the hydrogel along a longitudinal direction of the body; a rotor installed on the rotation shaft so as to
(Continued)

rotate together with the rotation shaft, wherein a plurality of rotor blades and a plurality of rotor recesses are alternately formed along a circumferential direction on an outer perimeter part of the rotor; and a stator surrounding the rotor with an air gap between the rotor and the stator, which is a predetermined distance between an outside diameter of the rotor and an inside diameter of the stator, and is fixed to the body.

13 Claims, 7 Drawing Sheets

(51) Int. Cl.
*B02C 18/22* (2006.01)
*B02C 18/30* (2006.01)

(52) U.S. Cl.
CPC ........ *B02C 18/062* (2013.01); *B02C 18/2216* (2013.01); *B02C 18/2258* (2013.01); *B02C 18/304* (2013.01)

(58) Field of Classification Search
CPC ........ B01F 27/40; B01F 27/41; B01F 27/411; B01F 27/412; B01F 25/45; B01F 25/4523; B01F 27/2711; B01F 27/84; B01F 27/91; B01F 27/911; B01F 27/92; B01F 27/9213; B01F 27/9214; B01F 2215/0422; B01F 2215/0431; B01F 23/41; B01F 27/1921; B01F 25/105; B01F 25/60; B01F 27/1125; B01F 27/114; B01F 27/1145; B01F 27/70; B01F 27/72; B01F 27/90; B01F 27/113; B01F 23/53; B01F 27/117; B01F 27/271; B01F 27/272; B01F 27/11; B01D 17/0217; B01D 19/0052; B02C 18/065; B02C 18/2216; B02C 18/2258; B02C 18/062; B02C 18/16; B02C 7/02; B02C 18/302; B29C 48/0022; B29C 48/04; B29C 48/345; B29C 48/695; B29B 7/428; B29B 7/429; B29B 7/582; B29B 9/06; B29B 9/12; C08F 2/01; C08J 3/12; C08J 3/24
USPC .................................................. 366/302, 305
See application file for complete search history.

(56) References Cited

U.S. PATENT DOCUMENTS 1,122,055 A * 12/1914 Asbury ................. B02C 18/302 241/82.5
2,218,119 A * 10/1940 Mcallister ............... B02C 18/36 241/246
3,542,104 A * 11/1970 Anderson ............. B02C 18/302 241/82.5
3,779,565 A * 12/1973 Witte .................... B02C 18/302 277/654
3,905,122 A 9/1975 Ohshima et al.
4,027,824 A * 6/1977 Fuller ..................... B02C 19/22 241/247
4,253,613 A * 3/1981 Reinhall .................. D21D 1/30 241/43
4,497,930 A 2/1985 Yamasaki et al.
RE32,649 E 4/1988 Brandt et al.
4,844,372 A 7/1989 Weiler et al.
4,883,478 A 11/1989 Lerailler et al.
4,908,101 A * 3/1990 Frisk ........................ D21C 7/00 241/247
5,629,034 A 5/1997 Terada et al.
5,633,329 A 5/1997 Hahnle et al.
5,686,698 A 11/1997 Mahadevan et al.
5,837,789 A 11/1998 Stockhausen et al.
5,875,982 A * 3/1999 Underberg ............. D21D 1/306 241/261.3
6,060,557 A 5/2000 Dahmen et al.
6,133,193 A 10/2000 Kajikawa et al.
6,229,062 B1 5/2001 Mandell et al.
6,299,084 B1 * 10/2001 Virving .................... D21D 1/30 241/246
6,325,308 B1 * 12/2001 Lofgren .................... B02C 7/12 241/261.3
9,803,033 B2 10/2017 Funk et al.
10,730,028 B2 8/2020 Kotake et al.
2001/0025093 A1 9/2001 Ishizaki et al.
2003/0071153 A1 * 4/2003 Aikawa .................... D21D 1/20 241/246
2004/0092688 A1 5/2004 Dairoku et al.
2004/0181031 A1 9/2004 Nogi et al.
2004/0242764 A1 12/2004 Yamada et al.
2009/0208748 A1 8/2009 Torii et al.
2010/0249320 A1 9/2010 Matsumoto
2011/0290920 A1 12/2011 Kim et al.
2011/0319518 A1 12/2011 Kadonaga et al.
2012/0108695 A1 5/2012 Won et al.
2012/0172536 A1 7/2012 Nogi et al.
2012/0202952 A1 8/2012 Funk et al.
2012/0315675 A1 12/2012 Medoff et al.
2013/0026412 A1 1/2013 Machida et al.
2014/0241108 A1 8/2014 Stöppler
2014/0339344 A1 11/2014 Kim et al.
2014/0371400 A1 12/2014 Tachi et al.
2015/0136888 A1 5/2015 Matsumoto et al.
2016/0199529 A1 7/2016 Torii et al.
2016/0311985 A1 10/2016 Jung et al.
2017/0029546 A1 2/2017 Langlotz
2017/0081442 A1 3/2017 Johnson et al.
2017/0267793 A1 9/2017 Imura et al.
2018/0298132 A1 10/2018 Yorino et al.
2019/0001302 A1 1/2019 Shuto et al.
2019/0105628 A1 4/2019 Kotake et al.
2019/0201868 A1 7/2019 Wakabayashi et al.
2019/0275192 A1 9/2019 Torii et al.
2019/0329219 A1 10/2019 Watabe et al.
2019/0329220 A1 10/2019 Watanabe et al.
2020/0316549 A1 10/2020 Kotake et al.
2020/0393318 A1 12/2020 Okawa et al.
2020/0398253 A1 12/2020 Kawada et al.
2020/0406228 A1 12/2020 Min et al.
2021/0009725 A1 1/2021 Nam et al.
2021/0115198 A1 4/2021 Yorino et al.
2021/0147637 A1 5/2021 Matsumoto et al.
2021/0147640 A1 5/2021 Hur et al.
2021/0269606 A1 9/2021 Wakabayashi et al.
2022/0111352 A1 4/2022 Kimura et al.
2022/0234015 A1 * 7/2022 Enomura ........... B01D 19/0052
2022/0258380 A1 8/2022 Choi et al.
2022/0379521 A1 12/2022 Woo et al.
2023/0097487 A1 3/2023 Yorino et al.
2023/0338925 A1 * 10/2023 Chung .................... B29B 7/582
2025/0196155 A1 * 6/2025 Jöchner ................. B02C 18/146

FOREIGN PATENT DOCUMENTS

CN 2480050 Y 3/2002
CN 1872890 A 12/2006
CN 101878816 A 11/2010
CN 201728110 U 2/2011
CN 103958039 A 7/2014
CN 104028718 A 9/2014
CN 104207258 A 12/2014
CN 107029575 A 8/2017
CN 207533357 U 6/2018
CN 108554595 A 9/2018
CN 210787668 U 6/2020
CN 210880398 U 6/2020
CN 212396873 U 1/2021
CN 112839993 A 5/2021
DE 2931275 A * 2/1980 .......... B01F 7/00758

(56) References Cited

FOREIGN PATENT DOCUMENTS

DE 10017899 A1 * 10/2001 .......... B01F 7/00758
DE 20 2014 105 679 U1 1/2015
EP 0096790 A1 12/1983
EP 0648537 A1 4/1995
EP 0778370 A1 * 6/1997
EP 1 130 045 A2 9/2001
EP 1147804 A1 * 10/2001 .......... B01F 7/00766
EP 1302590 A1 * 4/2003 ............... D21D 1/20
EP 2189478 A1 5/2010
EP 2557095 A1 2/2013
EP 3312218 A1 4/2018
EP 3473664 A1 4/2019
EP 3521343 A1 8/2019
EP 3543279 A1 9/2019
EP 3543280 A1 9/2019
EP 3711722 A1 9/2020
EP 3757153 A1 12/2020
EP 3795616 A1 3/2021
EP 3812420 A1 4/2021
EP 3842477 A1 6/2021
EP 3939756 A1 1/2022
EP 3984711 A1 4/2022
EP 4000736 A1 5/2022
EP 4 197 639 A1 6/2023
EP 4253451 A1 10/2023
EP 4 321 559 A1 2/2024
EP 4324868 A1 2/2024
EP 4 332 121 A1 3/2024
EP 4393991 A1 7/2024
FR 2679789 A1 * 2/1993 .............. B01F 7/164
GB 2536502 A * 9/2016 .............. B01F 13/10
JP S59-030826 A 2/1984
JP S62-286559 A 12/1987
JP 01321989 A * 12/1989
JP H03-76721 A 4/1991
JP H07-09176 A 1/1995
JP H08-017954 B2 2/1996
JP H09-067404 A 3/1997
JP 2783048 B2 5/1998
JP H10-137615 A 5/1998
JP H1128375 A * 2/1999
JP H11-188726 A 7/1999
JP 2000-63527 A 2/2000
JP 2000-143720 A 5/2000
JP 2002-177807 A 6/2002
JP 2002-543243 A 12/2002
JP 2003-82107 A 3/2003
JP 2004-300425 A 10/2004
JP 2007-2067 A 1/2007
JP 2007-071415 A 3/2007
JP 2007-77393 A 3/2007
JP 2008-038128 A 2/2008
JP 2009-52009 A 3/2009
JP 4727005 B2 7/2011
JP 2012-525454 A 10/2012
JP 2013-507465 A 3/2013
JP 5551836 B2 7/2014
JP 5619010 B2 11/2014
JP 2015-221910 A 12/2015
JP 2016-124901 A 7/2016
JP 2017-155194 A 9/2017
JP 2017-197703 A 11/2017
JP 2018-527453 A 9/2018
JP 2018-203997 A 12/2018
JP 2019-052285 A 4/2019
JP 2019-141754 A 8/2019
JP 6650162 B1 * 2/2020 ......... B01D 17/0217
JP 6685066 B1 * 4/2020 ......... B01D 17/0217
JP 2020-175379 A 10/2020
JP 2022-541140 A 9/2022
KR 10-0180956 B1 4/1999
KR 20-0252158 Y1 11/2001
KR 20050018471 A * 2/2005
KR 10-0823419 B1 4/2008
KR 10-0874695 B1 12/2008
KR 20-0446736 Y1 3/2009
KR 10-0904050 B1 6/2009
KR 10-0913875 B1 8/2009
KR 10-2009-0094416 9/2009
KR 10-2011-0003258 A 1/2011
KR 10-2011-0082133 A 7/2011
KR 10-2011-0131131 A 12/2011
KR 10-2011-0137081 A 12/2011
KR 10-2011-0138635 A 12/2011
KR 10-1280582 B1 7/2013
KR 10-2013-0096218 A 8/2013
KR 10-2015-0016241 A 2/2015
KR 10-2015-0019319 A 2/2015
KR 10-2015-0067729 A 6/2015
KR 10-1546919 B1 8/2015
KR 10-2015-0141424 A 12/2015
KR 10-2015-0141425 A 12/2015
KR 10-2016-0020864 A 2/2016
KR 10-2016-0078114 A 7/2016
KR 10-1645684 B1 8/2016
KR 10-2016-0149235 A 12/2016
KR 10-2017-0068276 6/2017
KR 10-2017-0095268 A 8/2017
KR 10-2018-0127377 A 11/2018
KR 10-2019-0027682 A 3/2019
KR 10-2019-0031483 A 3/2019
KR 10-2019-0069101 A 6/2019
KR 10-2019-0077540 A 7/2019
KR 10-2019-0077541 A 7/2019
KR 10-2015675 B1 8/2019
KR 10-2020-0007270 A 1/2020
KR 10-2020-0055648 A 5/2020
KR 10-2020-0056050 A 5/2020
KR 10-2020-0068376 A 6/2020
KR 10-2020-0116770 A 10/2020
KR 10-2021-0010504 A 1/2021
KR 10-2021-0013101 A 2/2021
KR 10-2021-0033876 A 3/2021
KR 10-2021-0046570 A 4/2021
KR 10-2021-0062459 A 5/2021
KR 20250081347 A * 6/2025
WO 87/03208 A1 6/1987
WO WO-8706496 A1 * 11/1987
WO WO-9107228 A * 5/1991 .......... B01F 15/0289
WO 1996/013542 A1 5/1996
WO 97/38740 A1 10/1997
WO 03/104286 A1 12/2003
WO 2010/040467 A1 4/2010
WO 2011/024971 A1 3/2011
WO 2011/157656 A3 12/2011
WO 2013/161229 A1 10/2013
WO 2015/030130 A1 3/2015
WO 2015/163508 A1 10/2015
WO 2016/105119 A1 6/2016
WO 2016/204302 A1 12/2016
WO 2017/115861 A1 7/2017
WO 2017/169246 A1 10/2017
WO 2018/092863 A1 5/2018
WO 2018/092864 A1 5/2018
WO 2018-147317 A1 8/2018
WO 2018/174175 A1 9/2018
WO 2019/111812 A1 6/2019
WO 2019/181410 A1 9/2019
WO 2019/221154 A1 11/2019
WO 2019/221236 A1 11/2019
WO 2020-067310 A1 4/2020
WO 2020-144948 A1 7/2020
WO 2020/145384 A1 7/2020
WO 2020/213192 * 10/2020
WO 2021/054564 A1 3/2021
WO 2021/075921 A1 4/2021
WO 2021/101277 A1 5/2021

(56) References Cited

FOREIGN PATENT DOCUMENTS

| | | | | |
|---|---|---|---|---|
| WO | WO-2022265476 A1 * | 12/2022 | | B02C 17/002 |
| WO | 2023/149681 A1 | 8/2023 | | |

OTHER PUBLICATIONS

Office Action dated Jan. 13, 2025 issued in related Korean Patent Application No. 10-2022-007462.
Office Action dated Jan. 16, 2025 issued in related U.S. Appl. No. 18/023,648.
Office Action dated Dec. 2, 2025 issued in related Japanese Application No. 2023-572206.
Extended European Search Report issued in application 22825391.0 dated Apr. 5, 2024.
Office Action dated Sep. 30, 2024 issued in the corresponding Chinese Patent Application No. 202280006016.6.
Office Action dated Jun. 4, 2024, of the corresponding Chinese Patent Application No. 202280006910.3.
Extended European Search Report dated Jun. 24, 2024, of the corresponding European Patent Application No. 22825382.9.
Database WPI, 2017, Clarivate Analytics, Thomson Scientific, AN 2007-305627, p. 1-2, XP 002810991.
Zaquen, et al., "Polymer Synthesis in Continuous Flow Reactors," Progress in Polymer Science, vol. 107, p. 1-40, 2020, XP 086212084.
Extended European Search Report issued Feb. 12, 2024 for European Patent Application No. 22825401.7.
Extended European Search Report issued Mar. 5, 2024 for European Patent Application No. 22825389.4.
Extended European Search Report dated Dec. 22, 2023, of the corresponding European Patent Application No. 22825399.3.
Extended European Search Report dated Dec. 15, 2023, of the corresponding European Patent Application No. 22825400.9.
Edana Standard Test method—WSP 270.3 (10) (cited by third party observation filed in KR 2022-008723 dated Oct. 17, 2023).
Edana Standard Test method—WSP 242.3.10, WSP 241.3.10 (cited by third party observation filed in KR 2022-008723 dated Oct. 17, 2023).
Buchholz et al., Modern Superabsorbent Polymer Technology, Wiley-VCH (cited by third party observation filed in KR 2022-008723 dated Oct. 17, 2023).
International Search Report and Written Opinion dated Sep. 23, 2022, issued in corresponding International Patent Application No. PCT/KR2022/008726.
Odian, "Principles of Polymerization," Second Edition, A Wiley-Interscience Publication, John Wiley & Sons, Inc., p. 203, (1981).
Schwalm, "UV Coatings Basics, Recent Developments and New Applications," Elsevier, p. 115, (2006).
Office Action dated Jan. 28, 2025 issued in related Japanese Patent Application No. 2023-539357.
Extended European Search Report dated Aug. 19, 2024, of the corresponding European Patent Application No. 22825394.4.
Extended European Search Report dated Sep. 16, 2024, of the corresponding European Patent Application No. 22825396.9.
Extended European Search Report dated Sep. 26, 2024, of the corresponding European Patent Application No. 22825395.1.

* cited by examiner

【FIG. 1】

MICRONIZING APPARATUS FOR HYDROGEL OF SUPER ABSORBENT POLYMER

CROSS-REFERENCE TO RELATED APPLICATION(S)

This application claims the benefit of Korean Patent Application No. 10-10-2021-0079644 filed on Jun. 18, 2021, Korean Patent Application No. 10-2021-0080344 filed on Jun. 21, 2021, and Korean Patent Application No. 10-2022-0074876 filed on Jun. 20, 2022 with the Korean Intellectual Property Office, the disclosures of which are herein incorporated by reference in their entirety.

TECHNICAL FIELD

This invention relates to a micronizing apparatus for hydrogel of super absorbent polymer, and more specifically, a micronizing apparatus for hydrogel of super absorbent polymer that may prevent excessive pressure from being applied on a cutting part, thus preventing vortex decrease, and prevent increase in extractable contents (E/C) of particles.

BACKGROUND

Super absorbent polymer (SAP) is polymer material in the form of white powder prepared by reacting acrylic acid with caustic soda, and it can absorb moisture of about five hundred to thousand times of its own weight. The super absorbent polymer is synthetic polymer material that is transformed to a jelly-like form, if it absorbs water, and can store water without discharging, even if a certain degree of pressure is applied from the outside.

Super absorbent polymer molecules have a network structure, and due to many pores between the molecules, easily absorb water. Due to concentration difference between ions in the super absorbent polymer and water, water moves inside super absorbent polymer (by osmosis). If water molecules are introduced inside super absorbent polymer, anions fixed inside try to occupy a specific space by repulsive force, and thus, the space of polymer chains expands and more water can be absorbed (electrostatic repulsion).

Such super absorbent polymer began to be commercialized as sanitary items, and currently, is being widely used as water-holding material for soil, water stop material for civil engineering and architecture, sheets for raising seedling, freshness preservatives in the field of food circulation, fomentation material, and the like, besides hygiene products such as paper diapers for children, and the like.

Super absorbent polymer is marketed as powder products after drying and grinding hydrogel or hydrogel polymer obtained through a polymerization reaction. In order to effectively progress such a drying process, it is important to increase the surface area of hydrogel polymer as much as possible. Thus, in order to increase the surface area of hydrogel polymer as much as possible before the drying process, a method of grinding hydrogel polymer polymerized through thermal polymerization or photo polymerization to increase the surface area of hydrogel polymer may be considered. A such, in order to increase the surface area of hydrogel polymer, a process wherein hydrogel polymer is polymerized, and then, is first ground, has been disclosed.

For the first grinding process of hydrogel, a chopper is mainly used.

Such a chopper includes a screw for moving hydrogel, a cutter for cutting hydrogel, and a hole plate including plural through holes where cut hydrogel polymer is discharged. According to the conventional chopper, if a screw transfers hydrogel to a cutting part including a cutter and a hole plate, hydrogel is cut by the hole plate and cutter until it becomes smaller than the through hole, and cut hydrogel passes through the through holes and is discharged.

Since a screw continuously pushes hydrogel to a cutting part until the hydrogel passes through the though holes, and cutting of hydrogel is continued until the hydrogel completely passes through the through holes, a strong pressure may be applied to the cutting part. Thus, damage to hydrogel particles may increase, and thus, extractable contents (E/C) of particles may increase, and vortex may become slow by the aggregation of particles.

In order to reduce a pressure applied to the cutting part, the thickness of the hole plate should be decreased, but since the hole plate may be broken by a pressure applied to the hole plate, thickness decrease is limited.

The background part has been described for better understanding of the background of the invention, and may include information other than prior art, already known to one of ordinary knowledge in the art.

DETAILED DESCRIPTION OF THE INVENTION

Technical Problem

It is an object of the invention to provide a micronizing apparatus for hydrogel of super absorbent polymer that can prevent excessive pressure from being applied to a cutting part, thus preventing vortex decrease, and prevent increase in extractable contents (E/C) of particles, by transferring hydrogel to the cutting part using centrifugal force.

Technical Solution

A micronizing apparatus for hydrogel of super absorbent polymer according to one embodiment of the invention may include: a body in which a transfer space where hydrogel is transferred, and a discharge space where ground hydrogel is discharged are formed inside; a rotation shaft rotatably disposed in the transfer space, wherein at least one screw is formed on an outer perimeter surface to transfer the hydrogel along a longitudinal direction of the body; a rotor installed on the rotation shaft so as to rotate together with the rotation shaft, wherein a plurality of rotor blades and a plurality of rotor recesses are alternately formed along a circumferential direction on an outer perimeter part of the rotor; and a stator that is spaced from the rotor radial outwardly by a predetermined gap and surrounds the rotor, and is fixedly installed in the body, wherein a plurality of stator blades and a plurality of stator recesses are alternately formed along the circumferential direction; wherein the hydrogel transferred to the rotor by the screw is transferred radial outwardly by centrifugal force and passes through the rotor recesses, cut/ground by the gap between the rotor and the stator, and discharged to the discharge space through the stator recesses.

A width of the rotor recess may be larger than a width of the stator recess.

The gap between the rotor and the stator may be smaller than the width of the stator recess.

The gap between the rotor and the stator may be 0.1 mm to 0.2 mm, and the width of the stator recess may be 0.2 mm to 3 mm.

The width of the stator recess may at least partially increase radial outwardly.

The stator blade may be spaced from the body, and the discharge space may be radially formed between the stator blade and the body.

The micronizing apparatus may further include: at least one cutter that is installed on the rotation shaft between the screw and the rotor and rotates together with the rotation shaft; and at least one hole plate that is spaced from the at least one cutter by a predetermined gap, fixedly installed in the body, and has a plurality of through holes formed in the at least one hole plate.

A diameter of through hole may be smaller than the width of the rotor recess.

The micronizing apparatus may further include: an inlet that is formed at an upper part of one side in the longitudinal direction of the body, and connected to the transfer space, the hydrogel being introduced into the inlet; and an outlet that is formed at a lower part of the other side in the longitudinal direction of the body, and connected to the discharge space, the hydrogel being discharged through the outlet.

The transfer space may be formed at the one side part in the longitudinal direction of the body, the discharge space may be formed at the other side part in the longitudinal direction of the body, and the rotor and stator may define a boundary between the transfer space and discharge space.

Advantageous Effects

According to the embodiment of the invention, by transferring hydrogel to a cutting part using centrifugal force, excessive pressure is prevented from being applied to the cutting part. Thus, vortex decrease may be prevented, and increase in E/C of particles may be prevented.

And, since the width of stator recess through which cut hydrogel passes increases radially toward the outside, damage of hydrogel may be prevented.

And, since a gap between a stator and a rotor may be reduced, hydrogel particles may be miniaturized.

Besides, effects that can be obtained or expected from the examples of the invention will be directly disclosed or suggested in the detailed explanations of the embodiments of the invention. Namely, various effects expected according to the examples of the invention will be disclosed in the detailed description described later.

BRIEF DESCRIPTION OF THE DRAWINGS

The embodiments of the invention will be better understood referring to the explanations below in relation to attached drawings where similar numeral references indicate identical or functionally similar elements.

Figure 1:
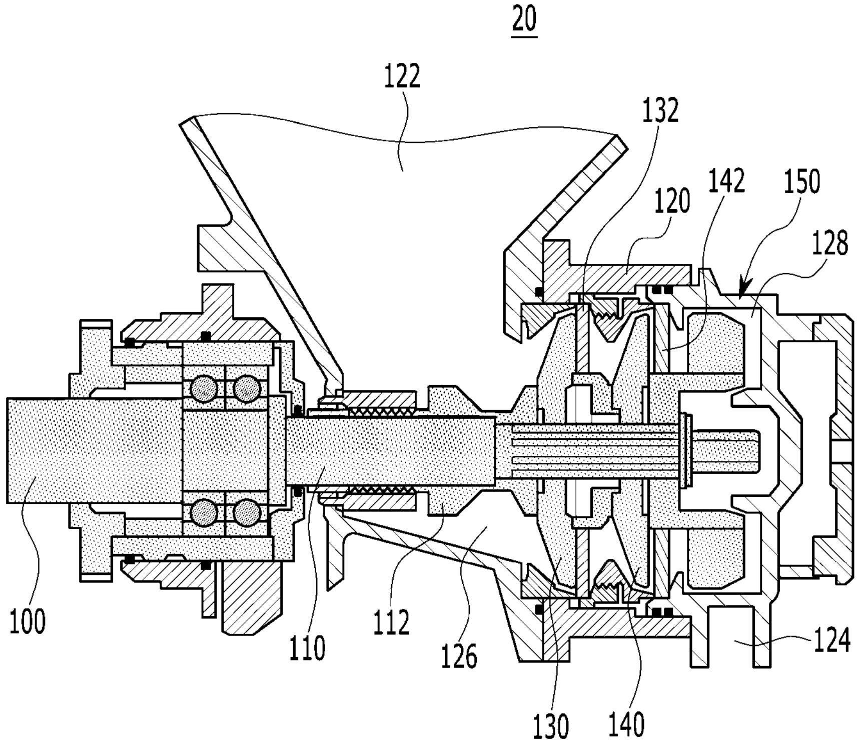
FIG. 1 is a cross sectional view of the micronizing apparatus for hydrogel of super absorbent polymer according to embodiment of the invention.

It should be understood that the drawings referred to above are not necessarily drawn to scale, and present simple expressions of various preferred characteristics illustrating the basic principle of the invention. For example, specific design characteristics including specific dimensions, directions, locations and shapes will be partly determined by specifically intended application and use environments.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "included", "including", "comprise", "comprising", "contains", "containing", etc. are intended to designate the existence of practiced characteristic, number, step, constructional element or combinations thereof, and they are not intended to preclude the possibility of existence or addition of one or more other characteristics, numbers, steps, constructional elements or combinations thereof. As used herein, the term "and/or" includes one of enumerated items in connection, or all the combinations.

As used herein, the term "polymer" means a polymerized state of water soluble ethylenically unsaturated monomers, and it may include those of all moisture content ranges or particle diameter ranges. Among the polymers, polymer after polymerization and before drying, and having a moisture content of about 40 wt % or more, may be referred to as hydrogel polymer.

And, the term "super absorbent polymer" means the polymer or base resin itself, or is used to include the polymer or base resin made appropriate for productization through additional process, for example, surface crosslinking, fine particles reassembling, drying, grinding, classification, and the like.

And, the term "fine particles" mean particles having particle diameter less than 150 μm among the super absorbent polymer particles. The particle diameter of such polymer particles may be measured according to European Disposables and Nonwovens Association (EDANA) standard EDANA WSP 220.3 method.

And, the term "chopping" means cutting hydrogel polymer to small pieces of millimeter unit so as to increase drying efficiency, and is distinguished from grinding to micrometer or normal particle level.

And, the term "micronizing" means grinding hydrogel polymer to particle diameter of tens to hundreds of micrometers, and is distinguished from "chopping".

The micronizing apparatus for hydrogel of super absorbent polymer according to embodiment of the invention transfers hydrogel to a cutting part by centrifugal force, thereby preventing excessive pressure from being applied to the cutting part, thus preventing vortex decrease, and preventing increase in extractable contents (E/C) of particles.

Hereinafter, the micronizing apparatus for hydrogel of super absorbent polymer according to embodiment of the invention will be explained in detail referring to attached drawings.

The preparation apparatus of super absorbent polymer according to embodiment of the invention includes a polymerization reactor, a micronizing apparatus, a dryer, a grinding apparatus, and a surface crosslinking apparatus.

The polymerization reactor induces a polymerization reaction of a monomer composition in the presence of an internal crosslinking agent and a polymerization initiator to form hydrogel polymer.

The polymerization reaction is a reaction of forming hydrogel polymer, wherein a monomer composition including water soluble ethylenically unsaturated monomers having acid groups, an internal crosslinking agent and a polymerization initiator is subjected to polymerization, to form polymer in which the water soluble ethylenically unsaturated monomers having acid groups and internal crosslinking agent are crosslinked (step 1).

The water soluble ethylenically unsaturated monomers making up the crosslinked polymer may be any monomers commonly used in the preparation of super absorbent polymer. As non-limiting examples, the water soluble ethylenically unsaturated monomers may be a compound represented by the following Chemical Formula 1:

$R^1$—$COOM^1$ [Chemical Formula 1]

In the Chemical Formula 1, $R^1$ is a C2-5 alkyl group comprising unsaturated bond, $M^1$ is a hydrogen atom, monovalent or divalent metal, an ammonium group or an organic amine salt.

Preferably, the monomer may be one or more selected from the group consisting of acrylic acid, methacrylic acid, and monovalent (alkali) metal salt, divalent metal salt, ammonium salt and organic amine salt of these acids. As such, in case acrylic acid and/or a salt thereof is used as water soluble ethylenically unsaturated monomers, super absorbent polymer with improved absorption property may be obtained. Besides, as the monomers, anionic monomers and salts thereof such as maleic anhydride, fumaric acid, crotonic acid, itaconic acid, 2-acryloylethane sulfonic acid 2-methacryloylethane sulfonic acid, 2-methacryloylpropane sulfonic acid, or 2-methacrylamide-2-methylpropane sulfonic acid; non-ionic hydrophilic containing monomers such as methacrylamide, N-substituted (meth)acrylate, 2-hydroxyethyl methacrylate, 2-hydroxypropyl methacrylate, methoxy polyethylene glycol methacrylate, polyethylene glycol methacrylate; and amino group containing unsaturated monomers and quarternized products thereof, such as (N,N)-dimethylaminoethyl.

Wherein, the water soluble ethylenically unsaturated monomers have acid groups. In the conventional preparation method of super absorbent polymer, monomers in which at least a part of the acid groups had been neutralized by a neutralization agent were subjected to crosslinking polymerization to form hydrogel polymer. Specifically, in the step of mixing the water soluble ethylenically unsaturated monomers having acid groups, internal crosslinking agent, polymerization initiator and neutralization agent, at least a part of the acid groups of the water soluble ethylenically unsaturated monomers were neutralized.

However, according to one embodiment of the invention, while the acid groups of the water soluble ethylenically unsaturated monomers are not neutralized, polymerization is first conducted to form polymer.

The water soluble ethylenically unsaturated monomers (for example, acrylic acid), of which acid groups are not neutralized, are liquid and have high miscibility with a solvent (water), and thus, exist in the state of a mixed solution in the monomer composition. However, water soluble ethylenically unsaturated monomers, of which acid groups are neutralized, are solid at room temperature, and have different solubilities according to the temperature of a solvent (water), and the solubility is lower as the temperature is lower.

As such, the water soluble ethylenically unsaturated monomers (for example, acrylic acid), of which acid groups are not neutralized, have higher solubility to or miscibility with a solvent (water) than the monomers of which acid groups are neutralized, and are not extracted even at low temperature, and thus, are favorable for polymerization for a long time at low temperature. Thus, by conducting polymerization for a long time using the water soluble ethylenically unsaturated monomers (for example, acrylic acid), of which acid groups are not neutralized, polymer having higher molecular weight and uniform molecular weight distribution may be stably formed.

And, polymer of longer chain can be formed, thus achieving the effect for reducing extractable contents that exist in non-crosslinked state due to incomplete polymerization or crosslinking.

And, as such, if polymerization is first conducted while the acid groups of the monomers are not neutralized, to form polymer, and the polymer is micronized in the presence of a surfactant after neutralization, or the acid groups existing in the polymer are neutralized simultaneously with micronization, the surfactant may exist on the surface of the polymer in large quantities, and sufficiently perform a function for lowering adhesion of polymer.

In the monomer composition, the concentration of the water soluble ethylenically unsaturated monomers may be appropriately controlled considering polymerization time and reaction conditions, and the like, and it may be controlled to about 20 to about 60 wt %, or about to about 50 wt %.

As used herein the term 'internal crosslinking agent' is used to distinguish from a surface crosslinking agent for crosslinking the surface of super absorbent polymer particles described later, and it functions for introducing crosslinks between unsaturated bonds of the above explained water soluble ethylenically unsaturated monomers, to form polymer comprising a crosslink structure.

In this step, crosslinking is progressed without distinction of a surface and inside, but in case a surface crosslinking process of super absorbent polymer is progressed as described later, the surface of the finally prepared super absorbent polymer particles may comprise a structure newly crosslinked by the surface crosslinking agent, and the inside of the super absorbent polymer particles may maintain the structure crosslinked by the internal crosslinking agent.

According to one embodiment of the invention, as the internal crosslinking agent, one or more of multifunctional acrylate-based compounds, multifunctional allyl-based compounds, or multifunctional vinyl-based compounds may be used.

As non-limiting examples of the multifunctional acrylate-based compounds, ethyleneglycol dimethacrylate, diethyleneglycol dimethacrylate, triethyleneglycol dimethacrylate, tetraethyleneglycol dimethacrylate, poly ethyleneglycol dimethacrylate, propyleneglycol dimethacrylate, tripropyleneglycol dimethacrylate, polylpropyleneglycol dimethacrylate, butanediol dimethacrylate, butylenegly col dimethacrylate, hexanediol dimethacrylate, pentaerythritol dimethacrylate, pentaerythritol tri(meth)acrylate, pentaerythritol tetramethacrylate, dipentaerythritol dimethacrylate, dipentaerythritol trimethacrylate, dipentaerythritol tetra (meth)acrylate, dipentaerythritol pentamethacrylate, trimethylolpropane dimethacrylate, trimethylolpropane trimethacrylate, glycerin dimethacrylate, and glycerin trimethacrylate, and the like may be mentioned, and one of them or two or more kinds of them may be mixed and used.

As non-limiting examples of the multifunctional allyl-based compounds, ethyleneglycol diallyl ether, diethyleneglycol diallyl ether, triethyleneglycol diallyl ether, tetraethyleneglycol diallyl ether, polyethyleneglycol diallyl ether, propyleneglycol diallyl ether, tripropyleneglycol diallyl ether, polypropyleneglycol diallyl ether, butanediol diallyl ether, butyleneglycol diallyl ether, hexanediol diallyl ether, pentaerythritol diallyl ether, pentaerythritol triallyl ether, pentaerythritol tetraallyl ether, dipentaerythritol diallyl ether, dipentaerythritol triallyl ether, dipentaerythritol tetraallyl ether, dipentaerythritol pentaallyl ether, trimethylolpropane diallyl ether, trimethylolpropane triallyl ether, glycerin diallyl ether, and glycerin triallyl ether, and the like may be mentioned, and one of them or two or more kinds of them may be mixed and used.

As non-limiting examples of the multifunctional vinyl-based compounds, ethyleneglycol divinyl ether, diethyleneglycol divinyl ether, triethyleneglycol divinyl ether, tetraethyleneglycol divinyl ether, polyethyleneglycol divinyl ether, propyleneglycol divinyl ether, tripropyleneglycol divinyl ether, polypropyleneglycol divinyl ether, butanediol divinyl ether, butyleneglycol divinyl ether, hexanediol divinyl ether, pentaerythritol divinyl ether, pentaerythritol trivinyl ether, pentaerythritol tetravinyl ether, dipentaerythritol divinyl ether, dipentaerythritol trivinyl ether, dipentaerythritol tetravinyl ether, dipentaerythritol pentainyl ether, trimethylolpropane divinyl ether, trimethylolpropane trivinyl ether, glycerin divinyl ether, and glycerin trivinyl ether, and the like may be mentioned, and one of them or two or more kinds of them may be mixed and used. Preferably, pentaerythritol triallyl ether may be used.

In the above explained multifunctional allyl-based compounds, or multifunctional vinyl-based compounds, two or more unsaturated groups included in the molecule respectively bind to the unsaturated bonds of water soluble ethylenically unsaturated monomers, or unsaturated bonds of other internal crosslinking agents, thus forming a crosslink structure during the polymerization process, and unlike acrylate-based compounds comprising an ester bond (—(C═O)O—) in the molecule, the crosslink may be more stably maintained during the neutralization process after the polymerization reaction.

Thus, gel strength of prepared super absorbent polymer may increase, process stability during a discharge process after polymerization may increase, and extractable contents may be minimized.

The crosslinking polymerization of water soluble ethylenically unsaturated monomers in the presence of such an internal crosslinking agent may be conducted in the presence of a thickener, a plasticizer, a preservative, an antioxidant, and the like, as necessary.

In the monomer composition, the internal crosslinking agent may be used in an amount of to 5 parts by weight, based on 100 parts by weight of the water soluble ethylenically unsaturated monomers. For example, the internal crosslinking agent may be used in an amount of 0.01 parts by weight or more, or 0.05 parts by weight or more, or 0.1 parts by weight or more, and 5 parts by weight or less, or 3 parts by weight or less, or 2 parts by weight or less, or 1 part by weight or less, or 0.7 parts by weight or less, based on 100 parts by weight of the water soluble ethylenically unsaturated monomers. If the content of the internal crosslinking agent is too low, crosslinking may not sufficiently occur, and thus, it may be difficult to realize strength above an optimum level, and if the content of the internal crosslinking agent is too high, the internal crosslinking density may increase, and thus, it may be difficult to realize desired centrifuge retention capacity.

The polymer formed using such an internal crosslinking agent has a three-dimensional network structure in which main chains formed by polymerization of the water soluble ethylenically unsaturated monomers are crosslinked by the internal crosslinking agent. As such, in case polymer has a three-dimensional network structure, compared to a two-dimensional linear structure that is not additionally crosslinked by an internal crosslinking agent, the properties of super absorbent polymer such as centrifuge retention capacity and absorbency under pressure may be remarkably improved.

According to one embodiment of the invention, the step of conducting polymerization of the monomer composition to form polymer may be conducted in a batch type reactor.

In the common preparation method of super absorbent polymer, the polymerization method is largely divided into thermal polymerization and photopolymerization according to polymerization energy source, and commonly, thermal polymerization may be progressed in a reactor equipped with a stirring axis such as a kneader, and photopolymerization may be progressed in a reactor equipped with a movable conveyor belt or in a flat-bottom container.

Meanwhile, by such a polymerization method, generally, polymer having modest molecular weight and wide molecular weight distribution is formed according to short polymerization reaction time (for example, 1 hour or less).

Meanwhile, in case photopolymerization is progressed in a reactor equipped with a movable conveyor belt or in a flat bottom container, hydrogel polymer sheet having a width of the belt is commonly obtained, and the thickness of the polymer sheet may vary according to the concentration of introduced monomer composition and introduction speed or introduction amount, but commonly, it may be about 0.5 to about 5 cm.

However, in case the monomer composition is supplied such that the thickness of the polymer sheet becomes too thin, production efficiency may be low, and in case the thickness of polymer sheet is increased for productivity, a polymerization reaction may not uniformly occur over the whole thickness, and thus, it may be difficult to form high quality polymer.

And, since polymerization in the reactor equipped with a stirring axis and conveyor belt is continuously progressed while polymerization product moves and new monomer composition is fed to the reactor, polymers having different polymerization rates may be mixed, and thus, polymerization may not uniformly occur over the whole monomer composition, thus causing property deterioration.

However, as explained above, according to one embodiment of the invention, by progressing fixed-bed type polymerization in a batch type reactor, there is little concern about mixing of polymers having different polymerization rates, and thus, polymer having uniform quality may be obtained.

And, the polymerization step is conducted in a batch type reactor having a predetermined volume, and a polymerization reaction is conducted for a longer time than the case of conducting continuous polymerization in a reactor equipped with a conveyor belt, for example, for 6 hours or more. Despite the long polymerization reaction time, since polymerization is conducted for non-neutralized water soluble ethylenically unsaturated monomers, even if polymerization is conducted for a long time, monomers may not be easily extracted, thus favorable for polymerization for a long time.

Meanwhile, the polymerization in a batch type reactor of the invention uses thermal polymerization, and thus, uses a thermal polymerization initiator as the polymerization initiator.

As the thermal polymerization initiator, one or more selected from the group consisting of persulfate-based initiators, azo-based initiators, hydrogen peroxide and ascorbic acid may be used. Specifically, as the examples of the persulfate-based initiators, sodium persulfate ($Na_2S_2O_8$), potassium persulfate ($K_2S_2O_8$), ammonium persulfate ($(NH_4)_2S_2O_8$), and the like, may be mentioned, and as the examples of the azo-based initiators, 2,2-azobis(2-amidinopropane) dihydrochloride, 2,2-azobis-(N,N-dimethylene) isobutyramidine dihydrochloride, 2-(carbamoylazo) isobutylnitrile, 2,2-azobis[2-(2-imidazolin-2-yl)propane] dihydrochloride, 4,4-azobis-(4-cyanovaleric acid), and the like may be mentioned. More various thermal polymerization initiators are stated in Odian, ‘Principle of polymerization (Wiley, 1981)’, p203, but the invention is not limited thereto.

Such a polymerization initiator may be used in an amount of 2 parts by weight or less, based on 100 parts by weight of the water soluble ethylenically unsaturated monomers. Namely, if the concentration of the polymerization initiator is too low, polymerization speed may become slow, and remaining monomers may be extracted in large quantities in the final product. To the contrary, if the concentration of the polymerization initiator is too high, polymer chains making up a network may become short, and thus, extractable contents may increase, and absorbency under pressure may decrease, thus deteriorating properties of polymer.

Meanwhile, according to one embodiment of the invention, polymerization may be initiated by introducing the initiator together with a reducing agent forming a redox couple with the initiator.

Specifically, the initiator and reducing agent, when introduced in a polymerization solution, react with each other to form radicals.

The radicals formed react with monomers, and since the oxidation-reduction reaction between the initiator and reducing agent is highly reactive, even if small amounts of initiator and reducing agent are introduced, polymerization may be initiated, thus enabling low temperature polymerization without need to increase process temperature, and minimizing property change of the polymer solution.

The polymerization using oxidation-reduction reaction may smoothly occur at a temperature around a room temperature (25° C.) or lower temperature. For example, the polymerization reaction may be conducted at a temperature of 5° C. or more and 25° C. or less, or 5° C. or more and 20° C. or less.

In one embodiment of the invention, in case a persulfate-based initiator is used as the initiator, as the reducing agent, one or more selected from the group consisting of sodium metabisulfite ($Na_2S_2O_5$); tetramethyl ethylenediamine (TMEDA); a mixture of iron sulfate(II) and EDTA ($FeS_4$/EDTA); sodium formaldehyde sulfoxylate; and disodium 2-hydroxy-2-sulfinoacteate may be used.

For example, potassium persulfate may be used as the initiator, and disodium 2-hydroxy-2-sulfinoacetate may be used as the reducing agent; ammonium persulfate may be used as the initiator, and tetramethyl ethylenediamine may be used as the reducing agent; or sodium persulfate may be used as the initiator, and sodium formaldehyde sulfoxylate may be used as the reducing agent.

In another embodiment of the invention, in case a hydrogen peroxide-based initiator is used as the initiator, the reducing agent may be one or more selected from the group consisting of ascorbic acid; sucrose; sodium sulfite ($Na_2SO_3$) sodium metabisulfite ($Na_2S_2O_5$); tetramethyl ethylenediamine (TMEDA); a mixture of iron sulfate(II) and EDTA ($FeSO_4$/EDTA); sodium formaldehyde sulfoxylate; disodium 2-hydroxy-2-sulfinoacteate; and disodium 2-hydroxy-2-sulfoacteate.

Besides, the monomer composition may further comprise additives such as a thickener, a plasticizer, a preservative, an antioxidant, and the like, as necessary.

And, the monomer composition may be prepared in the form of a solution dissolved in a solvent such as water, and the solid content in the monomer composition solution, i.e., the concentration of monomers, internal crosslinking agent and polymerization initiator may be appropriately controlled considering polymerization and reaction conditions, and the like. For example, solid content in the monomer composition may be 10 to 80 wt %, or 15 to 60 wt %, or 30 to 50 wt %.

Wherein, a solvent that can be used is not limited as long as it can dissolve the above explained components, and for example, water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methyl amyl ketone, cyclohexanone, cyclopentanone, diethyleneglycol monomethyl ether, diethyleneglycol ethyl ether, toluene, xylene, butyrolactone, carbitol, methyl cellosolve acetate and N,N-dimethylacetamide or mixtures thereof may be used.

Polymer obtained by such a method may have high molecular weight and uniform molecular weight distribution, and reduced extractable contents, because polymerization is conducted using non-neutralized ethylenically unsaturated monomers, Polymer obtained by such a method may have a moisture content of 30 to 80 wt %. For example, the moisture content of the polymer may be 30 wt % or more, or 45 wt % or more, or 50 wt % or more, and 80 wt % or less, or 70 wt % or less, or 60 wt % or less.

If the moisture content of polymer is too low, it may be difficult to secure appropriate surface area in the subsequent grinding step, and thus, the polymer may not be effectively ground, and if the moisture content of polymer is too high, pressure applied in the subsequent grinding step may increase, and thus, it may be difficult to grind to a desired particle size.

Meanwhile, throughout the specification, a “moisture content” is the content of moisture occupied, based on the total polymer weight, and it means a value obtained by subtracting the weight of dried polymer from the weight of polymer. Specifically, it is calculated by measuring weight decrease according to evaporation of moisture in the polymer while increasing the temperature of polymer in the state of crumb to dry through infrared heating. Wherein, a temperature is increased from a room temperature to about 180°

C., and then, maintained at 180° C., and the total drying time is set to 40 minutes including 5 minutes of the temperature rise step.

Next, a step of neutralizing at least a part of the acid groups of the polymer (step 2) is conducted.

Wherein, as the neutralization agent, basic material such as sodium hydroxide, potassium hydroxide, ammonium hydroxide, and the like, capable of neutralizing acid groups may be used.

And, a neutralization degree, which refers to a degree to which the acid groups included in the polymer are neutralized by the neutralization agent, may be 50 to 90 mol %, or, 60 to 85 mol %, or 65 to 85 mol %, or 65 to 75 mol %. The range of the neutralization degree may vary according to the final properties, but if the neutralization degree is too high, absorption capability of super absorbent polymer may decrease, and due to excessively low concentration of carboxylic groups on the surface of particles, it may be difficult to sufficiently conduct surface crosslinking in the subsequent process, and thus, absorbency under pressure or permeability may decrease. To the contrary, if the neutralization degree is too low, absorption force of polymer may significantly decrease, and the polymer may exhibit rubber-like property which is difficult to handle.

Simultaneously with the step 2, or before or after conducting the step 2, a step of micronizing the polymer in the presence of a surfactant to prepare hydrated super absorbent polymer (step 3) is conducted.

This step is a step of micronizing the polymer in the presence of a surfactant, wherein the polymer is not chopped to millimeter size, but finely cut to tens to hundreds of micrometers and simultaneously aggregated. Namely, by giving appropriate adhesion to polymer, secondary aggregated particles in which primary particles finely cut to tens to hundreds of micrometer size are aggregated, are prepared. The secondary aggregated particles prepared by such a step, i.e., hydrated super absorbent polymer particles, have normal particle size distribution, but have significantly increased surface area, and thus, have remarkably improved vortex time.

As such, after mixing the polymer with a surfactant, by micronizing the polymer in the presence of the surfactant, hydrated super absorbent polymer particles in the form of secondary aggregated particles formed by fine cutting and aggregation while super absorbent polymer particles and surfactant are mixed, may be prepared.

Wherein, "hydrated super absorbent polymer particles" refer to particles having moisture content of about 30 wt % or more, and since it is formed by fine cutting and aggregation of polymer to particles without a drying process, it may have a moisture content of 30 to 80 wt % like the polymer.

According to one embodiment of the invention, the surfactant may be one or more selected from the group consisting of compounds represented by the Chemical Formula 2 and salts thereof, but not limited thereto.

[Chemical Formula 2]

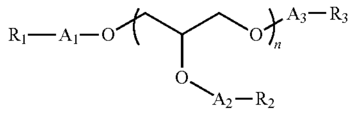

$A_1$, $A_2$ and $A_3$ are each independently, a single bond, carbonyl,

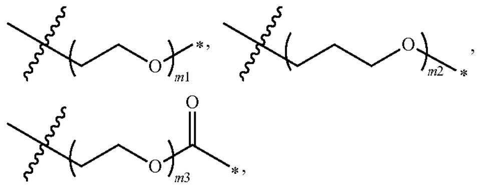

provided that one or more of them are carbonyl or

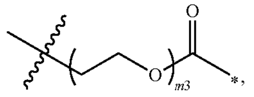

wherein m1, m2 and m3 are each independently, n integer of 1 to 8, each

is connected to adjacent oxygen atom, and each —* is connected to adjacent $R_1$, $R_2$ and $R_3$, $R_1$, $R_2$ and $R_3$ are each independently, hydrogen, C6-18 linear or branched alkyl or C6-18 linear or branched alkenyl, and n is an integer of 1 to 9.

The surfactant is mixed with polymer and added such that the micronization step may be easily conducted without aggregation.

The surfactant represented by the Chemical Formula 2 is a non-ionic surfactant, and has excellent surface adsorption capability even with non-neutralized polymer by hydrogen bonding force, and thus, is suitable for realization of aimed aggregation control effect. To the contrary, in the case of anionic surfactant, if it is mixed with polymer neutralized with a neutralization agent such as NaOH, $Na_2SO_4$, and the like, it may be adsorbed by Na+ ions to the carboxylic group substituent of polymer, and if it is mixed with non-neutralized polymer, due to competition of the carboxylic group substituent of polymer with anion, adsorption efficiency to polymer may be relatively degraded.

Specifically, in the surfactant represented by the Chemical Formula 2, hydrophobic functional groups are end functional groups $R_1$, $R_2$, $R_3$ (if not hydrogen), and hydrophilic functional groups include a part derived from glycerol in the chain, and hydroxyl groups at the end (in case $A_n$ is a single bond, and simultaneously, $R_n$ is hydrogen, n=1 to 3), wherein the glycerol-derived part and the end hydroxyl groups are hydrophilic functional groups and perform a function for improving adsorption capability to polymer surface. Thus, aggregation of super absorbent polymer particles may be effectively inhibited.

In the Chemical Formula 2, hydrophobic functional groups $R_1$, $R_2$, $R_3$ (if not hydrogen) are each independently, C6-18 linear or branched alkyl or C6-18 linear or branched alkenyl. Wherein, in case $R_1$, $R_2$, $R_3$ (not hydrogen) are alkyl or alkenyl having a carbon number less than 6, due to short chain length, aggregation of ground particles may not be effectively controlled, and in case $R_1$, $R_2$, $R_3$ (not hydrogen) are alkyl or alkenyl having a carbon number greater than 18, mobility of the surfactant may decrease, and thus, it may not be effectively mixed with polymer, and due to increase in surfactant cost, the unit cost of a composition may increase.

Preferably, $R_1$, $R_2$, $R_3$ may be hydrogen, or in case it is C6-18 linear or branched alkyl, it may be 2-methylhexyl, n-heptyl, 2-methylheptyl, n-octyl, n-nonyl, n-decanyl, n-undecanyl, n-dodecanyl, n-tridecanyl, n-tetradecanyl, n-pentadecenyl, n-hexadecanyl, n-heptadecanyl, or n-octadecanyl, or in case it is C6-18 linear or branched alkenyl, it may be 2-hexenyl, 2-heptenyl, 2-octenyl, 2-nonenyl, 2-decenyl, 2-undecenyl, 2-dodecenyl, 2-tridecenyl, 2-tetradecenyl, 2-pentadecenyl, 2-hexadecenyl, 2-heptadecenyl, or 2-octadecenyl.

The surfactant may be selected from compounds represented by the following Chemical Formula 2-1 to Chemical Formula 2-14:

[Chemical Formula 2-1]

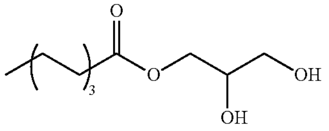

[Chemical Formula 2-2]

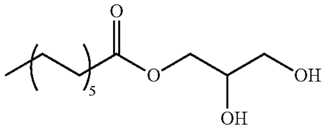

[Chemical Formula 2-3]

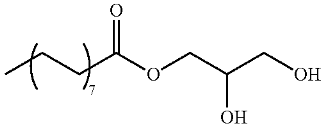

[Chemical Formula 2-4]

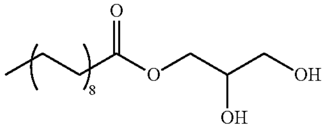

[Chemical Formula 2-5]

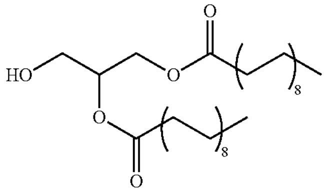

[Chemical Formula 2-6]

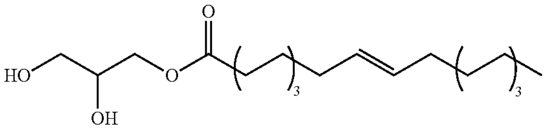

[Chemical Formula 2-7]

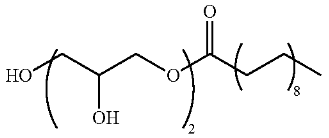

-continued

[Chemical Formula 2-8]

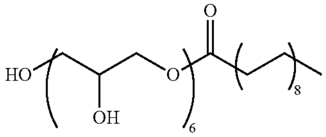

[Chemical Formula 2-9]

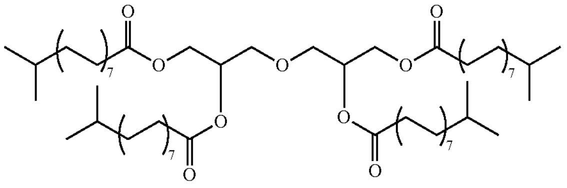

[Chemical Formula 2-10]

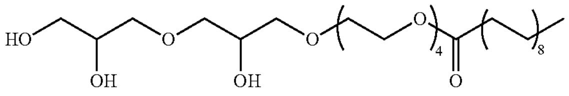

[Chemical Formula 2-11]

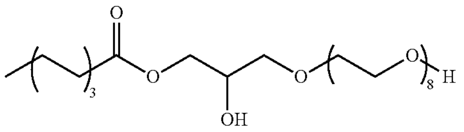

[Chemical Formula 2-12]

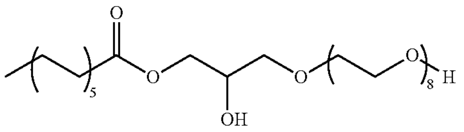

[Chemical Formula 2-13]

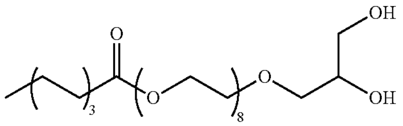

[Chemical Formula 2-14]

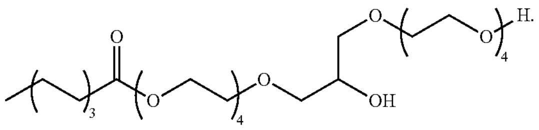

Meanwhile, the surfactant may be used in an amount of 0.01 to 10 parts by weight, based on 100 parts by weight of the polymer. If the amount of the surfactant used is too small, it may not be uniformly adsorbed on polymer surface, and thus, reaggregation of particles may be generated after grinding, and if the amount of the surfactant used is too large, the properties of the finally prepared super absorbent polymer may be deteriorated. For example, the surfactant may be used in an amount of 0.01 parts by weight or more, 0.015 parts by weight or more, or 0.1 parts by weight or more, and 5 parts by weight or less, 3 parts by weight or less, 2 parts by weight or less, or 1 part by weight or less, based on 100 parts by weight of the polymer.

A method for mixing such a surfactant with polymer is not specifically limited as long as it can uniformly mix them. Specifically, the surfactant may be dry mixed, or it may be dissolved in a solvent and then mixed in a solution state, or it may be molten and then mixed.

For example, the surfactant may be mixed in the state of a solution dissolved in a solvent. Wherein, as the solvent, inorganic solvents or organic solvents may be used without limitations, but considering easiness of a drying process and cost of solvent recovery system, water is most appropriate. And, the surfactant and polymer may be put in a reactor and mixed, or polymer may be put in a mixer and the solution may be sprayed, or polymer and the solution may be continuously supplied to a continuously operated mixer and mixed, and the like.

Meanwhile, according to one embodiment of the invention, the step of neutralizing at least a part of the acid groups of the polymer (step 2), and the step of micronizing the polymer in the presence of a surfactant, to prepare hydrated super absorbent polymer particles (step 3) may be sequentially, alternately or simultaneously conducted.

Namely, a neutralization agent may be introduced in polymer to neutralize the acid groups, and then, a surfactant may be introduced in the neutralized polymer and the polymer mixed with the surfactant may be micronized (conducted in the order of step 2→step 3); or a neutralization agent and a surfactant may be simultaneously introduced in polymer to conduct neutralization and micronization of polymer (simultaneously conducting step 2 and step 3). Alternatively, a surfactant may be introduced first, and a neutralization agent may be introduced later (conducted in the order of step 3→step 2). Alternatively, a neutralization agent and a surfactant may be alternately introduced. Alternatively, a surfactant may be introduced first for micronization, and then, a neutralization agent may be introduced for neutralization, and a surfactant may be additionally introduced in the neutralized hydrogel polymer to additionally conduct a micronization process.

Meanwhile, for uniform neutralization over the whole polymer, it may be preferable to set a regular time difference between the introduction of the neutralization agent and the micronization process.

At least a part or significant amount of the surfactant may exist on the surfaces of the hydrated super absorbent polymer particles.

Wherein, the description "the surfactant exists on the surfaces of hydrated super absorbent polymer particles" means that at least a part or significant amount of the surfactant is adsorbed or bonded to the surfaces of the hydrated super absorbent polymer particles. Specifically, the surfactant may be physically or chemically adsorbed to the surface of the super absorbent polymer. More specifically, the hydrophilic functional groups of the surfactant may be physically adsorbed to the hydrophilic parts of the super absorbent polymer surface by intermolecular force such as dipole-dipole interaction. As such, the hydrophilic parts of the surfactant are physically adsorbed to the surface of the super absorbent polymer particles to cover the surface, and the hydrophobic parts of the surfactant are not adsorbed to the surface of polymer particles, and thus, polymer particles may be coated with the surfactant in the form of a micelle structure. This is because the surfactant is not introduced during the polymerization process of the water soluble ethylenically unsaturated monomers, but introduced in the micronization step after formation of polymer, and compared to the case wherein the surfactant is introduced during the polymerization process and exists inside the polymer, a function as a surfactant may be fully performed, and since grinding and aggregation simultaneously occur, particles having large surface area may be obtained in the form of aggregated fine particles.

According to one embodiment of the invention, the step of micronizing the polymer to prepare hydrated super absorbent polymer may be conducted two or more times.

According to one embodiment of the invention, the micronizing step is conducted by a micronizing apparatus explained below.

In case polymer mixed with the surfactant is micronized using a micronizing apparatus, smaller particle size distribution may be realized, and the subsequent drying and grinding processes may be conducted under milder conditions, and thus, generation of fine particles may be prevented, and the properties of super absorbent polymer may be improved.

Hereinafter, referring to FIGS. 1 to 7, the micronizing apparatus 20 for hydrogel of super absorbent polymer according to example of the invention will be explained in more detail.

FIG. 1 is a cross sectional view of the micronizing apparatus for hydrogel of super absorbent polymer according to the embodiment of the invention.

As shown in FIG. 1, the micronizing apparatus 20 for hydrogel of super absorbent polymer according to the embodiment of the invention comprises a body 120, a driving motor 100, and a cutting part 130, 132, 140, 142, and 150.

In the body 120, a transfer space 126 where hydrogel is transferred, and a discharge space 128 where ground hydrogel is discharged are formed. The transfer space 126 is formed at one side part in the longitudinal direction of the body 120, and the discharge space 128 is formed at the other side part in the longitudinal direction of the body 120, and inside the body 120 between the transfer space 126 and discharge space 128, a cutting part 130, 132, 140, 142, and 150 is disposed. Namely, the cutting part 130, 132, 140, 142, and 150 may define a boundary between to the transfer space 126 and discharge space 128.

At the upper part of one side of the body 120, an inlet 122 connected to the transfer space 126 is formed, and thus, hydrogel discharged from a polymerization reactor (not shown) is introduced inside the body 120, i.e., transfer space 126 through the inlet 122. At the lower part of the other side of the body 120, an outlet 124 connected to the discharge space 128 is formed, and thus, hydrogel ground by the cutting part 130, 132, 140, 142, and 150 is discharged outside the body 120 through the outlet 124.

At one side of the body 120, a driving motor 100 is disposed, and in the transfer space 126 of the body 120, a rotation shaft 110 is rotatably disposed, and the rotation shaft 110 is connected to the driving motor 100. Namely, one end of the rotation shaft 110 disposed in the transfer space 126 penetrates through one side surface of the body 120 and is connected to the driving motor 100.

At the outer perimeter surface of the rotation shaft 110, at least one screw 112 is formed. If the driving motor 100 provides a driving force to the rotation shaft 110 and the rotation shaft 110 rotates, the screw 112 rotates together with the rotation shaft 110 and transfers hydrogel in the transfer space 126 to the other side in the longitudinal direction toward the cutting part 130, 132, 140, 142, and 150.

Figure 2:
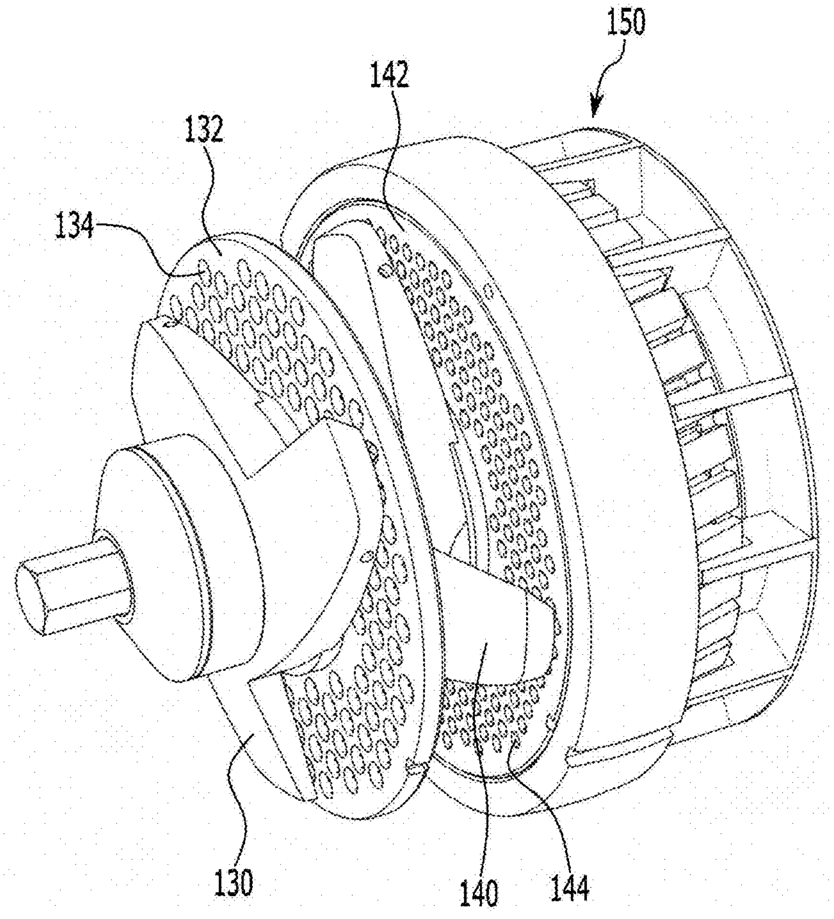
FIG. 2 is a perspective view of one example of the cutting part of the micronizing apparatus for hydrogel of super absorbent polymer according to embodiment of the invention.

FIG. 2 is a perspective view of one example of the cutting part of the micronizing apparatus for hydrogel of super absorbent polymer according to embodiment of the invention.

As shown in FIG. 2, the cutting part 130, 132, 140, 142, and 150 grinds hydrogel transferred by the screw 112 and discharges it to the discharge space 128.

According to one example, the cutting part 130, 132, 140, 142, and 150 may comprise first and second cutters 130 and 140, first and second hole plates 132 and 142, and a rotor/stator assembly 150. Although the cutting part is shown to include two cutters/hole plates and one rotor/stator assembly 150 herein, the number of cutters/hole plates and rotor/stator assembly is not specifically limited. For example, the cutting part may comprise one cutter/hole plate and one rotor/stator assembly 150, or may comprise at least one rotor/stator assembly 150 without cutter/hole plate. However, in order to prevent excessive pressure from being applied to the cutting part, the cutting part should necessarily comprise one rotor/stator assembly 150 most closely disposed to the discharge space 128.

According to one example, the rotor/stator assembly 150 is disposed at the other end of the rotation shaft 110, and the first, second cutters 130 and 140 and the first and second hole plates 132 and 142 are disposed between the screw 112 and rotor/stator assembly 150.

The first and second hole plates 132 and 142 are spaced from each other and fixedly installed inside the body 120, and at one side of the first and second hole plates 132 and 142, the first and second cutters 130 and 140 are respectively rotatably disposed.

At the first hole plate 132, plural first through holes 134 are formed in the longitudinal direction, and at the second hole plate 142, plural second through holes 144 are formed in the longitudinal direction. The diameter of the second through hole 144 may be smaller than the diameter of the first through hole 134 so that hydrogel may be crushed more and more finely while being transferred in the longitudinal direction by the screw 112.

The first cutter 130 is disposed at one side of the first hole plate 132 while being spaced by predetermined first gap. The first cutter 130 is equipped with plural first cutter blades, and installed on the rotation shaft 112 so as to rotate together with the rotation shaft 112. The second cutter 140 is disposed at one side of the second hole plate 142 while being spaced by predetermined second gap. The second cutter 140 is equipped with plural second cutter blades, and installed on the rotation shaft 112 so as to rotate together with the rotation shaft 112. The second gap may be smaller than the first gap so that hydrogel may be crushed more and more finely while being transferred in the longitudinal direction by the screw 112.

Hydrogel transferred to the cutting part by the screw 112 is first ground/cut by the first cutter 130 and the first hole plate 132 and passes through the first through holes 134. Hydrogel having passed through the first through holes 134 is second ground/cut by the second cutter 140 and the second hole plate 142 and passes through the second through holes 144. And then, hydrogel is transferred to the rotor/stator assembly 150.

The rotor/stator assembly 150 finally grinds/cuts second ground/cut hydrogel and discharges it to the discharge space 128. The rotor/stator assembly 150 comprises a rotor 160 installed on the rotation shaft 110 so as to rotate together with the rotation shaft 110, and a stator 170 that is spaced from the rotor radially toward the outside by predetermined gap and surrounds the rotor, and is fixedly installed in the body 120.

Figure 3:
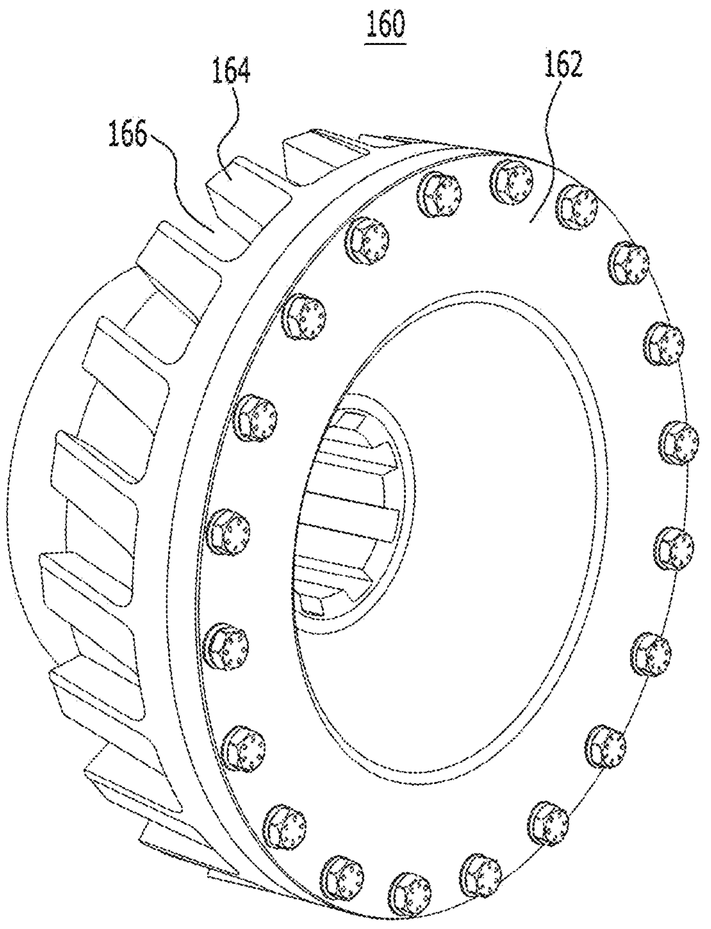
FIG. 3 is one perspective view of the rotor of the rotor/stator assembly according to embodiment of the invention.
Figure 4:
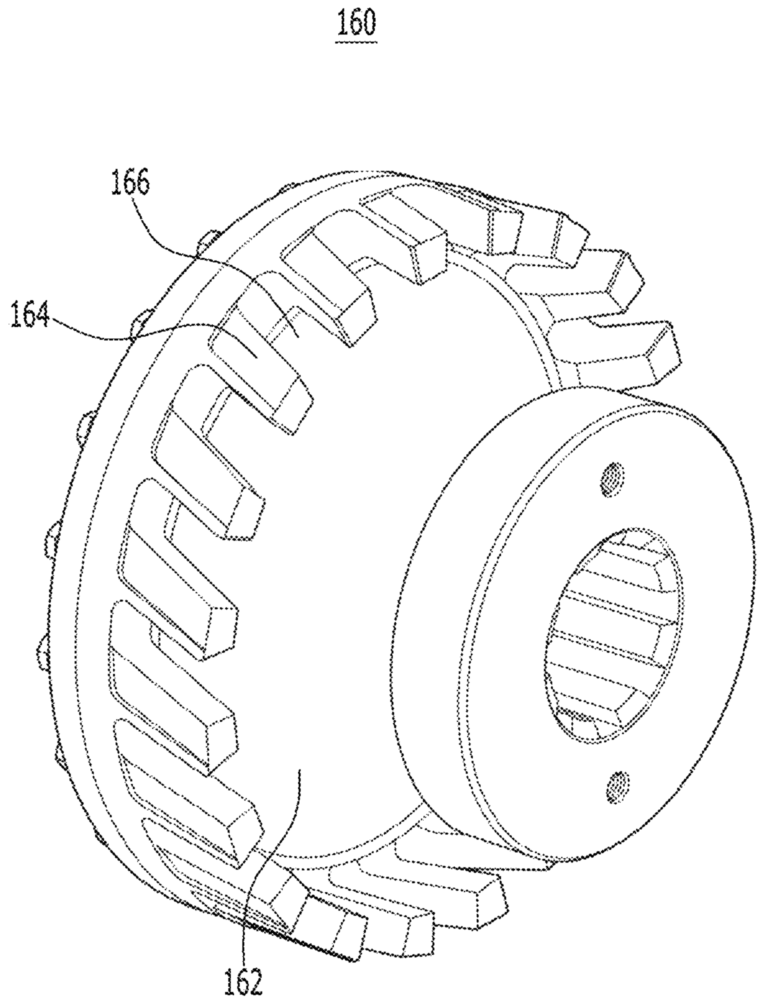
FIG. 4 is another perspective view of the rotor of the rotor/stator assembly according to embodiment of the invention.

FIG. 3 is one perspective view of the rotor of the rotor/stator assembly according to embodiment of the invention, and FIG. 4 is another perspective view of the rotor of the rotor/stator assembly according to embodiment of the invention.

As shown in FIG. 3 and FIG. 4, the rotor 160 is formed in a cylindrical shape as a whole, and comprises a disk part 162, plural rotor blades 164, and plural rotor recesses 166. According to one example, by spline joint of the inner perimeter surface of the rotor 160 to the rotation shaft 110, the rotor 160 may rotate together with the rotation shaft 110.

The disk part 162 is formed at the other end in the longitudinal direction of the cylindrical rotor 160. One side of the disk part 162 (a side of the disk part 162 facing the second hole plate 142)) is formed with curvature, and thus, may guide hydrogel rotating on the cylindrical part of the rotor 160 to move radially toward the outside by centrifugal force.

The plural rotor blades 164 are disposed along the circumferential direction at the outer perimeter part of one side of the disk part 162. The plural rotor blades 164 extend toward one side in the longitudinal direction at the outer perimeter part of one side of the disk part 162, and between adjacent rotor blades 164, rotor recesses 166 are formed. Namely, rotor blades 164 and rotor recesses 166 are alternatively formed along the circumferential direction. The width of the rotor recess 166 may be larger than the diameter of the second through hole 144 so that hydrogel having passed through the second through holes 144 may pass through the rotor recesses 166. Thus, hydrogel having moved radially toward the outside by centrifugal force continuously moves radially toward the outside through the plural rotor recesses 166.

Figure 5:
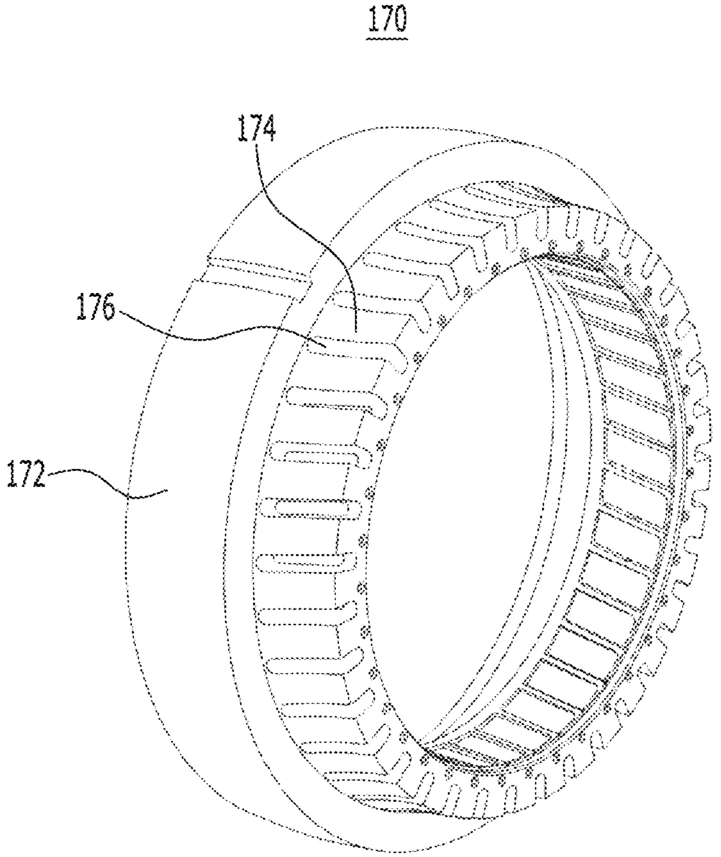
FIG. 5 is one perspective view of the stator of the rotor/stator assembly according to embodiment of the invention.
Figure 6:
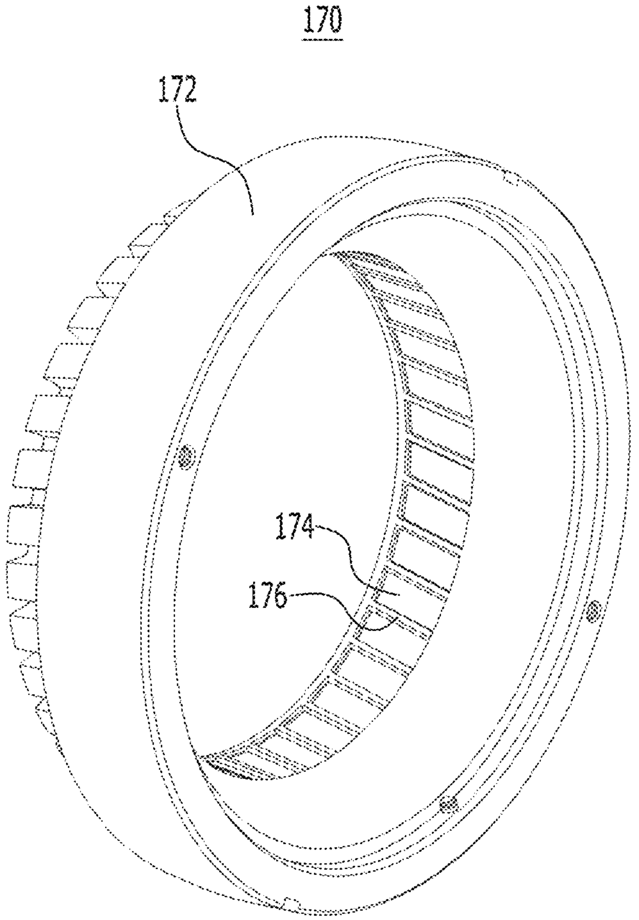
FIG. 6 is another perspective view of the stator of the rotor/stator assembly according to embodiment of the invention.

FIG. 5 is one perspective view of the stator of the rotor/stator assembly according to embodiment of the invention, and FIG. 6 is another perspective view of the stator of the rotor/stator assembly according to embodiment of the invention.

As shown in FIG. 5 and FIG. 6, the stator 170 is formed in a cylindrical shape as a whole, and comprises an outer perimeter surface 172, plural stator blades 174 and plural stator recesses 176.

The outer perimeter surface 172 is fixed to the body 120, and at one side of the outer perimeter surface 172, plural stator blades 174 extend toward one side in the longitudinal direction, and between adjacent stator blades 174, stator recesses 176 are formed. Namely, stator blades 174 and stator recesses 176 are alternately formed along the circumferential direction.

Meanwhile, the plural stator blades 174 may be formed at radially inner side than the outer perimeter surface 172. If the outer perimeter surface 172 is fixed to the body 120, the plural stator blades 174 are radially spaced from the body 120 and between the plural stator blades 174 and body 120, a discharge space 128 is radially formed. Thus, hydrogel having passed through the stator recesses 176 is discharged to the discharge space 128.

Figure 7:
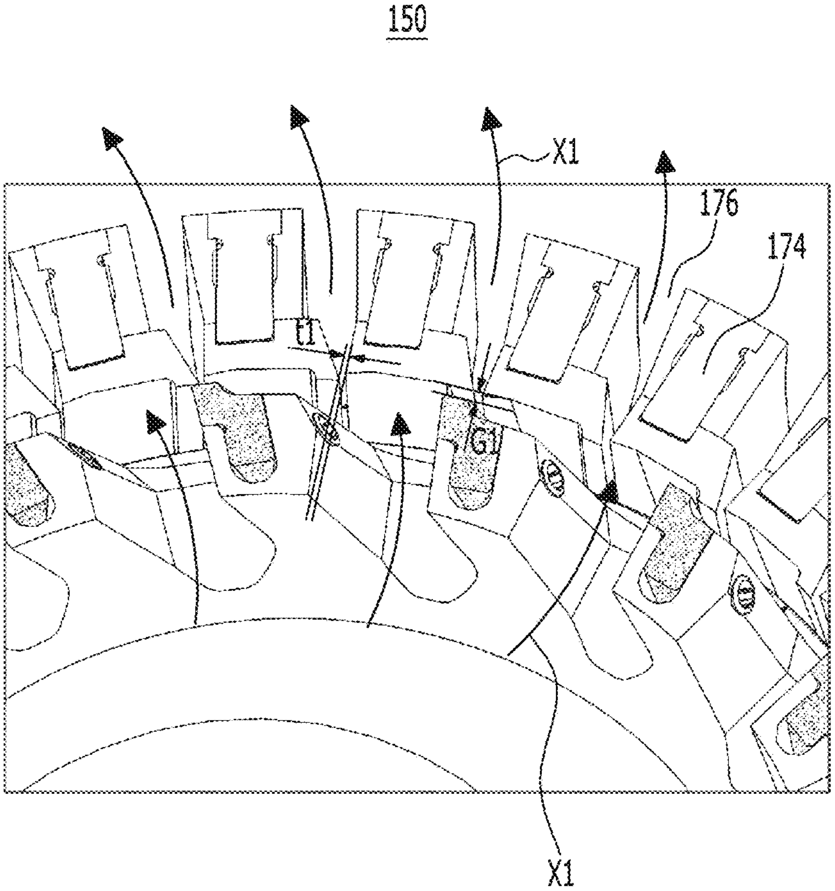
FIG. 7 is a perspective view showing a part of the rotor/stator assembly according to embodiment of the invention.

FIG. 7 is a perspective view showing a part of the rotor/stator assembly according to embodiment of the invention.

As shown in FIG. 7, the stator 170 is spaced from the rotor 160 radially toward the outside by predetermined gap (G1) and surrounds the rotor 160. And, the width of the rotor recess 166 is larger than the width (t1) of the stator recess 176. The width (t1) of the stator recess 176 at least partially increases radially toward the outside. Namely, the width of the inner perimeter surface of the stator recess 176 is smaller than the width of the outer perimeter surface of the stator recess 176.

The gap (G1) between the rotor 160 and stator 170 may be smaller than the width (t1) of the stator recess 176 so that hydrogel cut/ground by the rotor 160 and stator 170 may pass through the stator recess 176. According to one example, the gap (G1) between the rotor 160 and stator 170 may be about 0.1 mm to about 0.2 mm, and the width (t1) of the stator recess 176 may be about 0.2 mm to about 3.0 mm.

Hydrogel having passed through the second through holes 144 is transferred to the cylindrical part of the rotor 160, and while rotating on the cylindrical part of the rotor 160, moves radially toward the outside by centrifugal force. As explained above, the width of the rotor recess 166 may be larger than the diameter of the second through hole 144 so that hydrogel (X1) having moved radially toward the outside may pass through the rotor recess 166 and continuously move radially toward outside, and reach the inner perimeter surface of the stator 170.

The hydrogel (X1) is finely crushed/cut by the gap (G1) between the rotor 160 and stator 170. As explained above, since the gap (G1) between the rotor 160 and stator 170 is smaller than the width (t1) of the stator recess 176, the size of hydrogel ground/cut by the gap (G1) between the rotor 160 and stator 170 may be smaller than the width (t1) of the stator recess 176, and thus, the hydrogel (X1) may pass through the stator recesses 176.

Wherein, since the hydrogel (X1) passes through the stator recesses 176 by centrifugal force instead of the feed force of the screw 112, and the width (t1) of the stator recess 176 increases radially toward the outside, strong pressure is not applied to the hydrogel passing through the stator recesses 176. Thus, damage of hydrogel may be prevented, thereby preventing vortex decrease and preventing increase in E/C of particles.

And, since strong pressure is not applied to the hydrogel passing through the stator recesses 176, hydrogel particles may be further miniaturized. Thus, subsequent grinding process may be omitted, and slowing of vortex may be prevented.

Hydrogel having passed through the stator recesses 176 is discharged to the discharge space 128, and discharged outside the body 120 through the outlet 124.

And then, a step of drying the micronized hydrogel to prepare dried super absorbent polymer particles (step 4) is conducted.

In this step, the moisture of hydrated super absorbent polymer particles obtained by micronizing the polymer in the presence of a surfactant, at least a part of the acid groups of the polymer being neutralized, is dried.

In the common preparation method of super absorbent polymer, it is in general that the drying step is conducted until the moisture content of super absorbent polymer particles become less than 10 wt %, but according to one embodiment of the invention, drying is conducted such that the moisture content of super absorbent polymer becomes 10 wt % or more, for example, about 10 to about 20 wt %, or about 10 to about 15 wt %. However, the invention is not limited thereto.

For this purpose, a temperature in a dryer used in the drying step may be about 150° C. or less, for example, about 80° C. to about 150° C., and the drying may be conducted at relatively low temperature. If the temperature in a dryer is too low, drying time may be too lengthened, and if the drying temperature is too high, super absorbent polymer having lower moisture content than the above desired moisture content may be obtained.

Wherein, drying may be conducted by moving type drying. Such moving type drying is distinguished from fixed-bed type drying according to whether material moves or not during drying.

The moving type drying refers to a method of drying while mechanically stirring a dried body. Wherein, a direction where hot air passes through material may be identical to or different from the circulation direction of the material. Alternatively, material may be circulated inside a dryer, and heat transfer fluid may be passed through a separate pipe outside the dryer to dry the material.

On the other hand, fixed-bed type drying refers to a method of drying wherein hot air passes through material from the top to the bottom, while material to be dried is stopped on a bottom such as a perforated steel plate through which air can pass.

Thus, it is preferable that hydrated super absorbent polymer is dried by moving type drying because uniform drying can be completed in a short time.

As an apparatus capable of moving type drying, a horizontal-type mixer, a rotary kiln, a paddle dryer, a steam tube dryer, or commonly used moving type dryers, and the like, may be used.

Next, a step of grinding the dried super absorbent polymer particles to prepare super absorbent polymer particles (step 5) is conducted.

Specifically, the grinding step may be conducted by grinding dried super absorbent polymer particles to a particle size of normal particle level, namely, particle diameter of 150 μm to 850 μm.

A grinder used for this purpose may be specifically, a vertical pulverizer, a turbo cutter, a turbo grinder, a rotary cutter mill, a cutter mill, a disc mill, a shred crusher, a crusher, a chopper or a disc cutter, and the like, but is not limited thereto.

And, as a grinder, a pin mill, a hammer mill, a screw mill, a roll mill, a disc mill or a jog mill, and the like may be also used, but is not limited thereto.

Meanwhile, according to the preparation method of the invention, in the micronizing step, super absorbent polymer particles of smaller particle size distribution may be realized than in the conventional chopping step, and in case moving type drying is conducted, a moisture content after drying is 10 wt % or more, and maintained relatively high, and thus, even if grinding is conducted with smaller grinding force under mild conditions, super absorbent polymer having very high content of normal particles of 150 μm to 850 μm may be prepared, and the generation rate of fine particles may be significantly reduced.

The super absorbent polymer particles thus prepared may comprise super absorbent polymer particles having particle diameter of 150 μm to 850 μm, namely normal particles, in the content of 80 wt % or more, 85 wt % or more, 89 wt % or more, 90 wt % or more, 92 wt % or more, 93 wt % or more, 94 wt % or more, or 95 wt % or more, based on the total weight. The particle diameter of polymer particles may be measured according to European Disposables and Nonwovens Association (EDANA) standard EDANA WSP 220.3 method.

And, the super absorbent polymer particles may comprise fine particles having particle diameter less than 150 μm, in the content of about 20 wt % or less, or about 18 wt % or less, or about 15 wt % or less, or about 13 wt % or less, or about 12 wt % or less, or about 11 wt % or less, or about 10 wt % or less, or about 9 wt % or less, or about 8 wt % or less, or about 5 wt % or less, based on the total weight. It is contrasting to super absorbent polymer prepared according to the conventional preparation method, having fine particle content of greater than about 20 wt % to about 30 wt %.

After the step of grinding the super absorbent polymer particles, a step of classifying the ground super absorbent polymer particles according to particle diameter may be further included.

And, after grinding and/or classifying the super absorbent polymer particles, a step of forming a surface crosslink layer on at least a part of the surfaces of the super absorbent polymer particles in the presence of a crosslinking agent may be further included. By the step, crosslinked polymer included in the super absorbent polymer particles is additionally crosslinked by a surface crosslinking agent, thus forming a surface crosslink layer on at least a part of the surfaces of the super absorbent polymer particles.

Example 1

In a 2 L glass container equipped with a stirrer and a thermometer, 100 g of acrylic acid and 0.30 g of pentaerythritol triallyl ether (P-30) internal crosslinking agent were introduced, and mixed with 226 g of water while stirring. Wherein, the reaction temperature was maintained at and to the resultant mixture, nitrogen was introduced at 1000 c/min for 1 hour. And then, 1.3 g of 0.3% hydrogen peroxide aqueous solution, 1.5 g of 1% ascorbic acid aqueous solution, 3.0 g of 2% 2,2'-azobis amidinopropane dihydrochloride aqueous solution, and 1.5 g of 0.01% iron sulfate aqueous solution were added and mixed. After a polymerization reaction began in the resultant mixture and the temperature of the polymer reached 85° C., polymerization was conducted in an oven of 90±2° C. for about 6 hours to prepare hydrogel polymer.

To the prepared hydrogel polymer, as a surfactant, glycerol monolaurate (GML) of the following structure was added in the form of an aqueous solution in high temperature water such that the amount became 0.3 parts by weight, based on 100 parts by weight of the hydrogel polymer, and then, the hydrogel polymer was micronized using a micronizing apparatus for hydrogel 20. The micronizing apparatus for hydrogel 20 comprised a rotor/stator assembly 150, and the rotor/stator assembly 150 micronized obtained hydrogel polymer. Wherein, a gap (G1) between the rotor 160 and stator 170 was 0.1 mm, and the width (t1) of the stator recess 176 was 0.2 mm.

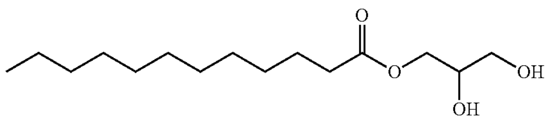 [SMILES: CCCCCCCCCCCC(=O)OCC(O)CO]

And then, in the micronized hydrated super absorbent polymer particles, 50% NaOH aqueous solution was introduced to neutralize a part of the acid groups of the polymer, and after introducing in a rotary mixer, the polymer was dried at 150° C. while stirring at a speed of 100 rpm for 60 minutes, to obtain super absorbent polymer particles (base resin).

Example 2 to Example 4 and Comparative Example 3

Hydrogel polymer was obtained by the same method as Example 1, and the obtained hydrogel polymer was micronized with a micronizing apparatus for hydrogel 20, and then, dried to prepare super absorbent polymer.

However, in Example 2, the gap (G1) between the rotor 160 and stator 170 was 0.1 mm, and the width (t1) of the stator recess 176 was 3.0 mm, and in Example 3, the gap (G1) between the rotor 160 and stator 170 was 0.2 mm, and the width (t1) of the stator recess 176 was 0.4 mm, and in Example 4, the gap (G1) between the rotor 160 and stator 170 was 0.2 mm, and the width (t1) of the stator recess 176 was 3.0 mm, and in Comparative Example 3, the gap (G1) between the rotor 160 and stator 170 was 0.2 mm, and the width (t1) of the stator recess 176 was 0.1 mm.

Comparative Example 1 and Comparative Example 2

Hydrogel polymer was obtained by the same method as Example 1, and the obtained hydrogel polymer was micronized with the conventional chopper, and then, dried to prepare super absorbent polymer. Wherein, the chopper comprises a hole plate having plural through holes, and a cutter disposed in the vicinity of the hole plate.

However, in Comparative Example 1, the size of each through hole was 16 mm, and in Comparative Example 2, the size of each through hole was 4 mm.

Experimental Example

The properties of the super absorbent polymers prepared in Examples were evaluated as follows, and the results were shown in Table 1.

Unless otherwise indicated, all the following property evaluations were progressed at constant temperature constant humidity (23±1° C., relative humidity 50±10%), and a physiological saline or brine means an aqueous solution of 0.9 wt % sodium chloride (NaCl).

And, otherwise indicated, property evaluations were conducted for polymers having particle diameter of 300 μm to 400 μm, classified with ASTM standard sieve.

(1) Vortex Time

A vortex time was measured as the unit of seconds, according to the method described in International Patent Publication No. 1987-003208.

Specifically, in 50 mL of physiological saline of 23° C. to 24° C., 2 g of super absorbent polymer (particle diameter 300 to 400 μm) was introduced, and stirred with a magnetic bar (diameter 8 mm, length 30 mm) at 600 rpm, and a time taken until vortex disappeared was measured as the unit of seconds, to calculate a vortex time.

(2) Extractable Contents (wt %)

For 2 g of super absorbent polymer, extractable contents after swelling for 1 hour was measured according to EDANA WSP 270.3 method.

The measurement results of vortex and extractable contents were described in the following Table 1.

TABLE 1

| | Comparative Example 1 | Comparative Example 2 | Comparative Example 3 | Example 1 | Example 2 | Example 3 | Example 4 |
|---|---|---|---|---|---|---|---|
| Vortex (seconds) | 28 | 35 | 32 | 23 | 25 | 25 | 25 |
| Extractable contents | 4.2 | 5.2 | 4.6 | 3.3 | 3.3 | 3.4 | 3.5 |

TABLE 1-continued

| | Comparative Example 1 | Comparative Example 2 | Comparative Example 3 | Example 1 | Example 2 | Example 3 | Example 4 |
|---|---|---|---|---|---|---|---|
| (wt %) | | | | | | | |

As shown in Table 1, in Examples 1 to 4 wherein the gap (G1) between rotor 160 and stator 170 was 0.1 mm to 0.2 mm, and the width (t1) of stator recess 176 was 0.2 mm to 3 mm, vortex time was 25 seconds or less, which was relatively small, and extractable contents were 3.5 wt % and maintained relatively small.

To the contrary, in Comparative Examples 1 and 2 using the conventional chopper, vortex time was 28 seconds or more, which was relatively large, and extractable contents were 4.2 wt %, which was relatively large. And, in Comparative Example 3 wherein the gap (G1) between rotor 160 and stator 170 was 0.2 mm but the width (t1) of stator recess 176 was 0.1 mm, which was smaller than the gap (G1), vortex time was 32 seconds, which was relatively large, and extractable contents were 4.6 wt %, which was relatively large.

Although preferable examples of the invention have been explained, the invention is not limited to the examples, and includes all the modifications within a range easily modified from the examples of the invention by a person having ordinary knowledge in the art and recognized as being equivalent.

The invention claimed is:

1. A micronizing apparatus for hydrogel of super absorbent polymer comprising:

a source of hydrogel is the super absorbent polymer;

a body having a transfer space where the hydrogel is transferred, and a discharge space where ground hydrogel is discharged;

a rotation shaft disposed in the transfer space, wherein at least one screw is formed on an outer perimeter surface of the rotation shaft, to transfer the hydrogel along a longitudinal direction of the body;

a rotor installed on the rotation shaft so as to rotate together with the rotation shaft, wherein a plurality of rotor blades and a plurality of rotor recesses are alternately formed along a circumferential direction on an outer perimeter part of the rotor; and a stator surrounding the rotor with an air gap between the rotor and the stator, which is a predetermined distance between an outside diameter of the rotor and an inside diameter of the stator, and is fixed to the body, wherein a plurality of stator blades and a plurality of stator recesses are alternately formed along the circumferential direction;

wherein the hydrogel transferred to the rotor by the screw moves radially and outwardly by centrifugal force and passes through the rotor recesses, is cut and/or ground in the air gap between the rotor and the stator, and is discharged to the discharge space through the stator recesses, wherein the air gap between the rotor and the stator is 0.1 mm to 0.2 mm, and a width of each of the stator recesses is 0.2 mm to 3 mm, and wherein the super absorbent polymer is prepared from a compound represented by the following Chemical Formula 1:

$R^1$—$COOM^1$ [Chemical Formula 1]

in the Chemical Formula 1, $R^1$ is a C2-5 alkyl group comprising unsaturated bond, $M^1$ is a hydrogen atom, monovalent or divalent metal, an ammonium group or an organic amine salt.

2. The micronizing apparatus for hydrogel of super absorbent polymer according to claim 1, wherein a width of at least one of the rotor recesses is larger than a width of at least one of the stator recesses.

3. The micronizing apparatus for hydrogel of super absorbent polymer according to claim 1, wherein the stator blades are spaced from the body, and the discharge space is radially formed between the stator blades and the body.

4. The micronizing apparatus for hydrogel of super absorbent polymer according to claim 1, further comprising an inlet formed at an upper part of the body, and connected to the transfer space, through which the hydrogel is introduced into the body; and an outlet formed at a lower part of the body, and connected to the discharge space, through which the hydrogel is discharged from the body.

5. The micronizing apparatus for hydrogel of super absorbent polymer according to claim 4, wherein the transfer space is formed at one side in the longitudinal direction of the body, the discharge space is formed at an opposite side in the longitudinal direction of the body, and the rotor and stator define a boundary between the transfer space and discharge space.

6. A micronizing apparatus for hydrogel of super absorbent polymer comprising:

a source of hydrogel is the super absorbent polymer;

a body having a transfer space where the hydrogel is transferred, and a discharge space where ground hydrogel is discharged;

a rotation shaft disposed in the transfer space, wherein at least one screw is formed on an outer perimeter surface of the rotation shaft, to transfer the hydrogel along a longitudinal direction of the body;

a rotor installed on the rotation shaft so as to rotate together with the rotation shaft, wherein a plurality of rotor blades and a plurality of rotor recesses are alternately formed along a circumferential direction on an outer perimeter part of the rotor; and a stator surrounding the rotor with an air gap between the rotor and the stator, which is a predetermined distance between an outside diameter of the rotor and an inside diameter of the stator, and is fixed to the body, wherein a plurality of stator blades and a plurality of stator recesses are alternately formed along the circumferential direction;

wherein the hydrogel transferred to the rotor by the screw moves radially and outwardly by centrifugal force and passes through the rotor recesses, is cut and/or ground in the air gap between the rotor and the stator, and is discharged to the discharge space through the stator recesses, wherein the air gap between the rotor and the stator is smaller than a width of at least one of the stator recesses, wherein a width of each of the stator recesses at least partially increases radial outwardly, and wherein the super absorbent polymer is prepared from a compound represented by the following Chemical Formula 1:

$R^1$—$COOM^1$ [Chemical Formula 1]

in the Chemical Formula 1, $R^1$ is a C2-5 alkyl group comprising unsaturated bond, $M^1$ is a hydrogen atom, monovalent or divalent metal, an ammonium group or an organic amine salt.

7. The micronizing apparatus for hydrogel of super absorbent polymer according to claim 6, wherein a width of at least one of the rotor recesses is larger than a width of at least one of the stator recesses.

8. The micronizing apparatus for hydrogel of super absorbent polymer according to claim 6, wherein the stator blades are spaced from the body, and the discharge space is radially formed between the stator blades and the body.

9. The micronizing apparatus for hydrogel of super absorbent polymer according to claim 6, further comprising an inlet formed at an upper part of the body, and connected to the transfer space, through which the hydrogel is introduced into the body; and an outlet formed at a lower part of the body, and connected to the discharge space, through which the hydrogel is discharged from the body.

10. A micronizing apparatus for hydrogel of super absorbent polymer comprising:

a source of hydrogel is the super absorbent polymer;

a body having a transfer space where the hydrogel is transferred, and a discharge space where ground hydrogel is discharged;

a rotation shaft disposed in the transfer space, wherein at least one screw is formed on an outer perimeter surface of the rotation shaft, to transfer the hydrogel along a longitudinal direction of the body;

a rotor installed on the rotation shaft so as to rotate together with the rotation shaft, wherein a plurality of rotor blades and a plurality of rotor recesses are alternately formed along a circumferential direction on an outer perimeter part of the rotor;

a stator surrounding the rotor with an air gap between the rotor and the stator, which is a predetermined distance between an outside diameter of the rotor and an inside diameter of the stator, and is fixed to the body, wherein a plurality of stator blades and a plurality of stator recesses are alternately formed along the circumferential direction;

at least one cutter attached to the rotation shaft, located between the screw and the rotor, and rotating together with the rotation shaft; and at least one hole plate spaced from the at least one cutter by a predetermined distance, installed in the body, and having a plurality of through holes;

wherein the hydrogel transferred to the rotor by the screw moves radially and outwardly by centrifugal force and passes through the rotor recesses, is cut and/or ground in the air gap between the rotor and the stator, and is discharged to the discharge space through the stator recesses, wherein a diameter of the through hole is smaller than a width of at least one of the rotor recesses, and wherein the super absorbent polymer is prepared from a compound represented by the following Chemical Formula 1:

$R^1$—$COOM^1$ [Chemical Formula 1]

in the Chemical Formula 1, $R^1$ is a C2-5 alkyl group comprising unsaturated bond, $M^1$ is a hydrogen atom, monovalent or divalent metal, an ammonium group or an organic amine salt.

11. The micronizing apparatus for hydrogel of super absorbent polymer according to claim 10, wherein a width of at least one of the rotor recesses is larger than a width of at least one of the stator recesses.

12. The micronizing apparatus for hydrogel of super absorbent polymer according to claim 10, wherein the stator blades are spaced from the body, and the discharge space is radially formed between the stator blades and the body.

13. The micronizing apparatus for hydrogel of super absorbent polymer according to claim 10, further comprising an inlet formed at an upper part of the body, and connected to the transfer space, through which the hydrogel is introduced into the body; and an outlet formed at a lower part of the body, and connected to the discharge space, through which the hydrogel is discharged from the body.

* * * * *